United States Patent [19]

Carver

[11] Patent Number: 4,993,183

[45] Date of Patent: Feb. 19, 1991

[54] BANANA OIL IMPREGNATED FISHING LURES

[75] Inventor: Robert G. Carver, Many, La.

[73] Assignee: Mr. Twister, Inc., Minden, La.

[21] Appl. No.: 522,807

[22] Filed: May 14, 1990

[51] Int. Cl.$^5$ .................. A23K 1/18; A01K 85/00
[52] U.S. Cl. ........................ 43/42.06; 426/1; 43/42.24
[58] Field of Search .............. 43/42.06, 42, 42.24; 426/1

[56] References Cited

U.S. PATENT DOCUMENTS

| | | | |
|---|---|---|---|
| 2,797,519 | 7/1957 | Keller | 43/42.06 |
| 2,979,778 | 4/1961 | Simons | 43/42.06 |
| 3,953,934 | 5/1976 | Visser | 43/42.06 |
| 4,589,223 | 5/1986 | Hastings | 43/42.24 |
| 4,927,643 | 5/1990 | D'Orazio et al. | 43/42.06 |

FOREIGN PATENT DOCUMENTS 0138346  8/1982  Japan .................. 426/1

*Primary Examiner*—Kurt Rowan
*Assistant Examiner*—Timothy M. Boynton
*Attorney, Agent, or Firm*—John M. Harrison

[57] ABSTRACT

Banana oil impregnated plastic fishing lures which are provided in various sizes, shapes, colors and resiliency, in order to increase the lure retention time in the mouth of a fish during a strike. In a preferred embodiment the banana oil is impregnated in the plastic fishing lures by mixing the oil into the plastisol while the plastisol is in a liquid state. The concentration of banana oil utilized may be any concentration which is sufficient to impart a banana flavor to the plastic fishing lures. The banana oil may also be added topically to the fishing lures either prior to or after packaging.

14 Claims, 1 Drawing Sheet

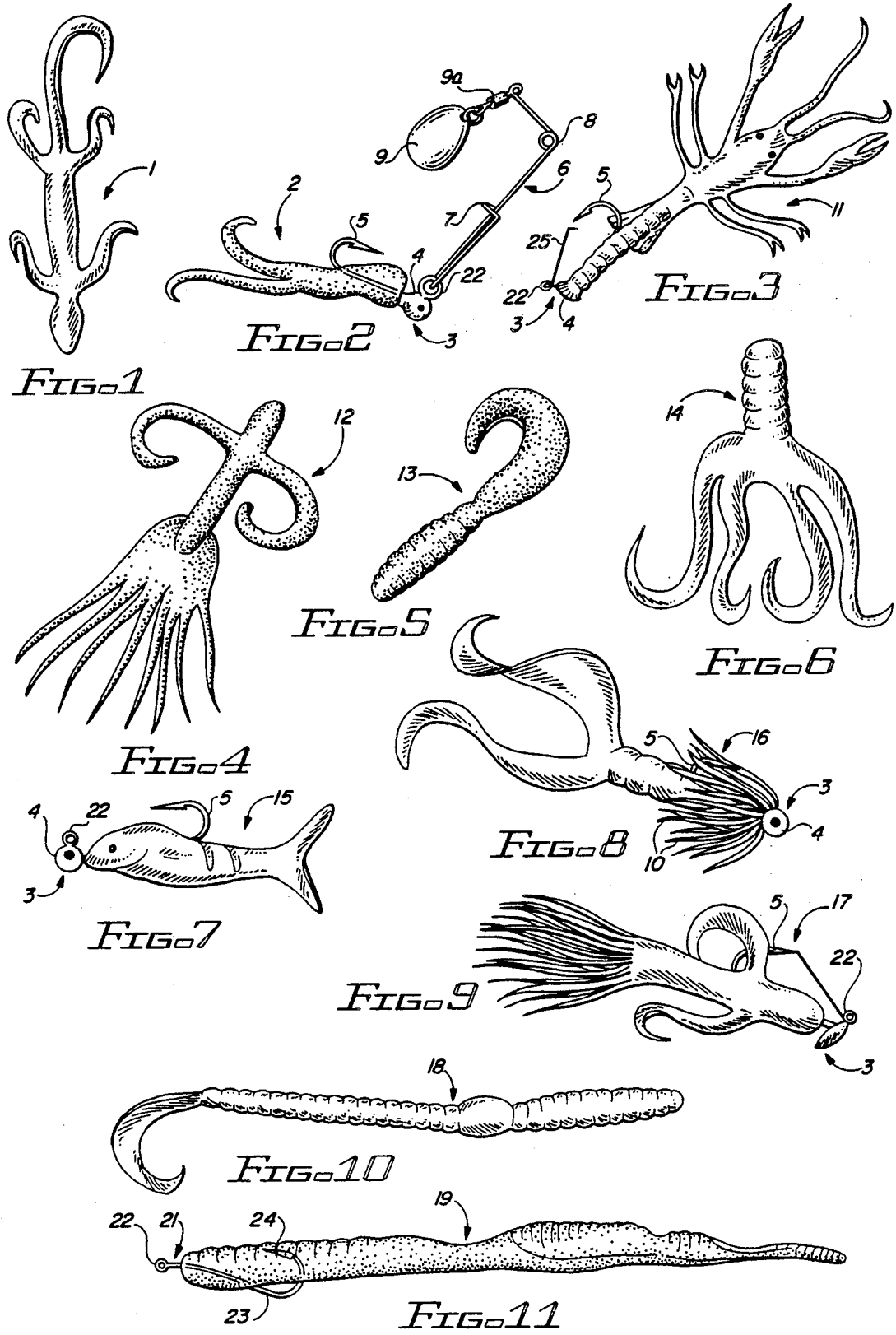

BANANA OIL IMPREGNATED FISHING LURES

BACKGROUND OF THE INVENTION

1. Field of the Invention

This invention relates to fishing lures and more particularly, to soft plastic fishing lures which are topically coated or impregnated with banana oil and may be used in connection with "jighead" type hooks and other hooks for retrieval. In a preferred embodiment, the fishing lures are shaped by injection-molding techniques in the configuration of a worm, shad, minnow, lizard or other fish, amphibian or animal and the lures include one or more tail portions which may be curved to ripple and simulate a life-like swimming action when the lure is retrieved. In one embodiment the lures are molded with a round tail having a swimming surface oriented transverse to the direction of lure retrieval, in order to provide resistance to water flow and cause the tail to effect an oscillating, simulated swimming action which causes the lure to vibrate.

In recent years, the sport of fresh water and salt water fishing has evolved into a big business with millions of dollars spent annually on boats, fishing tackle and lures. With the increasing interest and emphasis on taking such popular game fish as largemouth and smallmouth bass, has come rapid development and marketing of improved fishing tackle and new baits and lures in particular. Perhaps the most effective of all lures, particularly in taking the highly regarded bass, are the popular injection-molded plastic lures which simulate natural fish food, including bait fish such as small minnows or "shiners" and shad, as well as worms, grubs, salamanders, lizards and like food.

2. Description of the Prior Art

The development of plastic compositions which closely simulate the worms, shads, minnows and like natural fish food, along with modern injection-molding techniques for creating such life-like replicas, has resulted in remarkable innovation in the fishing industry. Various types of fish-attracting materials and formulas such as oil extracts, have also been developed for topical application to fishing lures, in order to provide a fish-attracting odor in the water in the vicinity of the lure. Although it is desirable to use such fish attractants, a recurring problem has been the delivery of such attractants to the immediate fishing area. One method has been to pour or spread the fish attractant on the water surface in the form of an oil or "chum". Since the oil or "chum" remains on or near the surface and does not move with the lure, such method is of limited value, especially when trolling. Another technique is to rub the oil extract or alternative fish attractant directly on the exterior of the bait or lure being used. However, contact with the water quickly disperses the small amount of oil or other material retained on the surface of the lure, thereby necessitating frequent re-application.

Another known technique for providing a fish attractant in combination with the fishing lure is to incorporate the fish attractant oil, extract or other material directly in a plastic utilized to shape flexible plastic artificial fishing worms and other lures. This method is described in U.S. Pat. No. 2,979,778 and is said to have the disadvantage of requiring incorporation of the fish attractant into the lure structure during the molding and formation of the flexible lure, thereby preventing reuse of the lure and incorporation of a different fish attractant in the lure when the lure is melted and remolded. Furthermore, certain fish attractants such as natural and biodegradable oils desirable for use in helping to catch fish, are incompatible with plastic molding processes.

A patent which relates to the use of a fish attractant with a fishing lure is U.S. Pat. No. 2,632,276, dated Mar. 24, 1953, to Roger W. Hale. The fish lure includes a fishing spoon which is adapted to retain a bait material and is designed to allow a controlled flow of water to pass through and over the bait material retained in the lure and extract odors and minute particles therefrom, which particles move from the artificial lure, thus creating a trail of bait-laden water through which the lure has passed, for attracting fish. U.S. Pat. No. 2,632,276, dated Apr. 6,1954, to C. H. Lindenberg, details a "Fish Lure" having a cavity or opening in the body thereof for receiving a capsule or cartridge containing or composed of a fish attractant. The bait socket is provided with projections for puncturing the cartridge when the cartridge is inserted in the socket, in order to exude the fish attractant and attract fish when the lure is retrieved. An "Artificial Bait for Fishing" is detailed in U.S Pat. No. 2,703,945, dated Mar. 15, 1955, to C. V. Johnson. The bait is provided with an internal cavity for retaining the liquid lure or an alternative solid or powdered, soluable lure material is slowly exuded from the lure body as the lure is retrieved to attract fish. U.S. Pat. No. 2,836,001, dated May 27, 1958, to M. L. Silen, details a "Fish Lure" having channels in the body thereof. A suitable amount of absorbant material such as yarn or cotton, which is saturated with fish oil, anise oil or other fish attractant is placed in channels, wherein the attractant is dissipated from the lure as the lure is retrieved. U.S. Pat. No. 3,854,234, dated Dec. 17, 1974, to John M. Hardin, details a "Catfish Bait" having coordinating components capable of being fabricated to simulate diversified larval forms or the like. An edible dough-ball-type core or filler incorporating cheeses, animal byproducts, cereal grains and suitable preservatives is molded to the size and shape desired and enclosed in a plastisol jacket located in the fishing bait. The jacket is porous, thereby liberating the flavor of the core or filler as the lure is retrieved. An "Odoriferous Fishing Device" is detailed in U.S. Pat. No. 3,953,934, dated May 4, 1976, to Melvin J. Visser. The fishing device includes a fishing body adapted for immersion in water and is constructed of a rigid, sintered metal body having a network of interconnected pores filled with a fish attractant such as anise oil, menhaden oil or the like. The attractant is released into the water from the pores at a uniform, slow rate to attract fish to the lure. A "Fishing Lure Simulating Fishing Bait" is detailed in U.S. Pat. No. 4,267,658, dated May 19, 1981, to Clarence C. Brown. The fishing lure is designed to attract fish by emitting the smell and taste of natural baits, wherein a basic feature includes a hollow lure body containing cut or ground frozen bait and cotton saturated with a combination of liquid fish extracts, for salt and fresh water fishing. The hollow body is perforated, such that the bait and bait extract slowly exude into water surrounding the U.S. Pat. No. 4,530,179, dated July 23, 1985, to Eugene T. Larew, details a "Salt Impregnated Fishing Lure". The fishing lure includes hook and body portions, the body portion being constructed of a vinyl plastisol having incorporated throughout the plastisol a sufficient quantity of salt to give the lure a salty taste.

Bass Pro Shops, of Springfield, Missouri, advertises and sells a "Garlic Worm" which includes an injection-molded plastic worm having garlic salt added to the final layer of the worm product.

It is an object of this invention to provide banana oil impregnated soft plastic fishing lures.

Another object of the invention is to provide soft, flexible plastic fishing lures which are impregnated or topically coated with banana oil for increasing the incidence of lure pick-up, as well as retention time and thereby increasing strike effectiveness, for larger catches of fish.

Yet another object of the invention is to provide soft, flexible plastic fishing lures which are impregnated with banana oil for lengthening the strike effectiveness interval and increasing catches of fish.

Still another object of this invention is to provide banana oil impregnated soft, injection-molded plastic fishing lures, wherein the banana oil is added to the fishing lures at the plastisol stage.

SUMMARY OF THE INVENTION

These and other objects of the invention are provided in banana oil impregnated flexible plastic fishing lures of various shape and plastic composition, wherein the banana oil is added to the product when the product is in the liquid plastisol phase before the injection molding step or topically before or after packaging.

BRIEF DESCRIPTION OF THE DRAWING

The invention will be better understood by reference to the following drawing, wherein:

FIG. 1 is a top view of a salamander flexible plastic lure;

FIG. 2 is a side view of a split-tail flexible plastic lure inserted on a jig having an offset spinner harness attached thereto for retrieving the lure;

FIG. 3 is a perspective view of a combination worm-crawfish flexible plastic lure fitted with a jig;

FIG. 4 is a top view of a fantail flexible plastic lure;

FIG. 5 is a side view of a curly tail jig flexible plastic lure;

FIG. 6 is a top view of a quad-tail flexible plastic lure;

FIG. 7 is a side view of a minnow flexible plastic lure inserted on a jig for retrieval purposes;

FIG. 8 is a perspective view of a double-tail flexible plastic lure inserted on a jig and provided with jig streamers;

FIG. 9 is a perspective view of a streamer tail flexible plastic lure inserted on a jig;

FIG. 10 is a side view of a curly tail worm flexible plastic lure; and

FIG. 11 is a side view of a ripple tail flexible plastic worm lure fitted with a conventional hook.

DESCRIPTION OF THE PREFERRED EMBODIMENTS

Referring initially to FIGS. 1, 4–6 and 10 of the drawing, the salamander lure 1, fantail lure 12, curly tail jig lure 13, quad-tail lure 14 and curly tail worm lure 18 are typically shaped of a soft plastic, as hereinafter described, and are flexible and resilient for insertion on hooks, jigs and other hook contrivances to simulate life-like organisms. For example, as further illustrated in FIG. 2, the split-tail lure 2 is threaded on the hook 5, extending from the jighead 4 of a jig 3 and one end of a conventional offset spinner harness 6 is attached to the hook eye 22 of the jighead 4. The offset spinner harness 6 further includes a harness clip 7, an eyelet 8, a spinner 9 and a swivel 9a, which rotatably secures the spinner 9 on the opposite end of the offset spinner harness 6. Other jighead hook attachments are illustrated in FIGS. 3, 7, 8 and 9, depicting a worm-crawfish lure 11, a minnow lure 15, a double tail lure 16, used in association with flexible jighead streamers 10, and a streamer tail lure 17, respectively, wherein the respective hooks 5 of the corresponding jigs 3 are threaded through the respective flexible lure bodies. The jighead 4 of a jig 3 may be fitted with a weed guard 25, as illustrated in FIGS. 3 and 9, as desired. The hook shank 23 of a single conventional hook 21 is inserted through the flexible body of the ripple tail worm lure 19, illustrated in FIG. 11, such that the hook tip 24 remains embedded in the body of the ripple tail worm lure 19.

The body segment of each of the plastic fishing lures illustrated in FIGS. 1-11 is typically shaped of an injection-molded soft, vinyl plastic material having a suitable composition to impart the desired degree of flexibility and softness. The vinyl plastic material consists of a vinyl plastisol (polyvinyl chloride) dispersion grade resin dispersed in a suitable solvent or plasticizer. The banana oil is most preferably added to the vinyl plastic material in liquid form, while the plastisol is in a liquid state. After addition of the banana oil in a selected concentration to the liquid plastisol, the plastisol is heated to the "gelation" or "fusion" temperature, in order to impart the desired resilience and strength to the plastic product. This well known technique for manufacturing plastic lure products is described in U.S. Pat. No. 4,530,179, to Larew, at column 1, lines 49–68, wherein it is noted that the term "gelation" refers to the physical change which occurs as the resin is dispersed in the plasticizer. As Larew suggests, at some point during the heating cycle, swelling of the resin particles causes a loss of fluidity and the plastisol develops a certain degree of film strength. At this point in the process, where the plastisol is characterized by certain properties such as lack of tackiness and a particular tensile strength, "gelation" occurs. After gelation, when mutual solution of plasticizer and resin occurs, the plastisol has said to have reached "fusion" and the degree of fusion of a particular plastisol is dependent on the ultimate temperature reached. Again at column 2, lines 3-6 of the Larew patent, it is noted that "The plastisol is formulated and heated according to known techniques for controlling the properties of plastisols, to give the lure body a desired degree of resilience and tensile strength".

Although it is most desirable to introduce the banana oil into the plastisol at some point during the liquid state, it will be appreciated that the banana oil may also be added to the completed, molded product as a topical application. The banana oil has been found to coat and adhere to the body of the injection-molded product even when the lure is immersed in water.

While the Larew patent deals with impregnating a vinyl plastic material with salt, applicant's invention consists of using liquid banana oil in a similar impregnation technique or as a topical coating to provide a banana flavor in plastic fishing lures of various composition, size, shape and character. Concentrations from a trace per gallon to about one milliliter per gallon have been found effective in attracting fish and concentrations of banana oil above ten milliliters per gallon have been found excessively strong, although these concentrations may be utilized, if so desired.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A plastic fishing lure having sufficient banana oil to impart a banana taste to said plastic fishing lure.

2. The plastic fishing lure of claim 1 wherein said banana oil is impregnated in said plastic fishing lure.

3. The plastic fishing lure of claim 2 wherein said banana oil is introduced into said plastic fishing lure while the plastic is in the liquid state.

4. The plastic fishing lure of claim 1 wherein said banana oil is characterized by a concentration of from about a trace per gallon to about 10 ml. per gallon.

5. The plastic fishing lure of claim 1 wherein said banana oil is added to said plastic fishing lure after said plastic fishing lure is formed.

6. The plastic fishing lure of claim 5 wherein said banana oil is characterized by a concentration of from about a trace per gallon to about 10 ml. per gallon.

7. The plastic fishing lure of claim 2 wherein said banana oil is characterized by a concentration of from about a trace per gallon to about 10 ml. per gallon.

8. A plastic fishing lure characterized by a plastisol of a resin dispersed in an organic solvent and sufficient banana oil impregnated in said plastisol to impart a banana taste to said fishing lure.

9. The plastic fishing lure of claim 8 wherein said plastisol further comprises a vinyl chloride plastisol.

10. The plastic fishing lure of claim 8 wherein said banana oil is characterized by a concentration of from a trace to about 1 ml. per gallon.

11. The plastic fishing lure of claim 8 wherein:
    (a) said plastisol further comprises a vinyl chloride plastisol; and
    (b) said banana oil is characterized by a concentration of from a trace to about 1 ml. per gallon.

12. A plastic fishing lure having sufficient banana oil added topically thereto to impart a banana taste to said plastic fishing lure.

13. The plastic fishing lure of claim 12 wherein said banana oil is characterized by a concentration of from a trace to about 10 ml. per gallon.

14. The plastic fishing lure of claim 12 wherein said banana oil is characterized by a concentration of from a trace to about 1 ml. per gallon.

* * * * *